(12) United States Patent
McGavin

(10) Patent No.: US 11,140,888 B2
(45) Date of Patent: Oct. 12, 2021

(54) INSECT TRAP WITH MULTIPLE INSERTS

(71) Applicant: Kory McGavin, Whitefish, MT (US)

(72) Inventor: Kory McGavin, Whitefish, MT (US)

( * ) Notice: Subject to any disclaimer, the term of this patent is extended or adjusted under 35 U.S.C. 154(b) by 343 days.

(21) Appl. No.: 16/361,330

(22) Filed: Mar. 22, 2019

(65) Prior Publication Data

US 2019/0216075 A1     Jul. 18, 2019

Related U.S. Application Data

(63) Continuation-in-part of application No. 15/620,768, filed on May 12, 2017, now Pat. No. 10,645,915, and a continuation-in-part of application No. 29/573,968, filed on Aug. 11, 2016, now Pat. No. Des. 812,183.

(60) Provisional application No. 62/646,755, filed on Mar. 22, 2018.

(51) Int. Cl.
| | |
|---|---|
| *A01M 1/02* | (2006.01) |
| *A01M 1/04* | (2006.01) |
| *A01N 25/00* | (2006.01) |
| *A01M 1/10* | (2006.01) |

(52) U.S. Cl.
CPC ............. *A01M 1/023* (2013.01); *A01M 1/02* (2013.01); *A01M 1/04* (2013.01); *A01M 1/106* (2013.01); *A01N 25/006* (2013.01)

(58) Field of Classification Search
CPC ......... A01M 1/023; A01M 1/02; A01M 1/106
USPC .......................................................... 43/107
See application file for complete search history.

(56) References Cited

U.S. PATENT DOCUMENTS

| | | | | |
|---|---|---|---|---|
| 149,918 | A * | 4/1874 | Clough | A01M 21/00 43/65 |
| 1,366,059 | A * | 1/1921 | Miller | A01M 1/106 43/118 |
| 1,544,334 | A * | 6/1925 | Martin | A01M 1/02 43/119 |
| 1,865,713 | A | 7/1932 | Taylor | |

(Continued)

FOREIGN PATENT DOCUMENTS

| | | | | |
|---|---|---|---|---|
| DE | 2821378 | A1 * | 11/1979 | A01M 1/106 |
| DE | 202020002111 | U1 * | 6/2020 | A01M 1/106 |

(Continued)

OTHER PUBLICATIONS

Pittalwala, Iqbal, "How Mosquitoes Are Drawn to Human Skin and Breath", Retrieved at: <<https://ucrtoday.ucr.edu/19377>>, Dec. 5, 2013, 3 pages.

(Continued)

*Primary Examiner* — Christopher P Ellis
(74) *Attorney, Agent, or Firm* — Medley, Behrens & Lewis, LLC

(57) ABSTRACT

An insect trap is provided with a bottle or bucket for holding insects and one or more conically-shaped, perforated inserts for insertion into the bottle or bucket. The insert includes holes for permitting light and visibility. The trap and/or trap insert may be made from a plastic or a polymer. Furthermore, insect attracting scents may be injected or impregnated into the plastic or polymer. A chemical exhibiting phosphorescence or photoluminescence may also be combined with the plastic and/or polymer. The bucket embodiment has a snap-on or screw-on lid with a high capacity for catching insects in an indoor or outdoor environment.

17 Claims, 14 Drawing Sheets

(56) References Cited

U.S. PATENT DOCUMENTS

| | | | |
|---|---|---|---|
| 1,867,252 A * | 7/1932 | Crigler | A01M 1/02 43/121 |
| 2,796,696 A * | 6/1957 | Dawson | A01M 1/02 43/121 |
| 3,320,692 A * | 5/1967 | Hellen | A01M 23/16 43/65 |
| 4,501,088 A | 2/1985 | Boisvert et al. | |
| 4,706,410 A | 11/1987 | Briese | |
| 4,794,724 A * | 1/1989 | Peters | A01M 1/02 43/107 |
| 4,873,787 A | 10/1989 | Schneidmiller | |
| 5,172,513 A * | 12/1992 | Reibling | A01M 1/02 43/107 |
| 5,207,345 A | 5/1993 | Stewart et al. | |
| 5,226,254 A * | 7/1993 | MacMenigall | A01M 1/10 43/107 |
| 5,231,791 A | 8/1993 | Falkson | |
| 5,339,563 A * | 8/1994 | Job | A01M 1/00 43/107 |
| 5,392,560 A | 2/1995 | Donahue et al. | |
| 5,557,880 A * | 9/1996 | Schneidmiller | A01M 1/02 43/107 |
| 6,158,165 A * | 12/2000 | Wilson | A01M 1/02 43/100 |
| 6,532,695 B1 * | 3/2003 | Alvarado | A01M 1/106 43/107 |
| 6,546,668 B1 * | 4/2003 | Ball | A01M 1/2005 43/107 |
| 6,637,149 B1 * | 10/2003 | Bauer | A01M 1/02 43/107 |
| 7,093,389 B1 * | 8/2006 | Meier | A01M 1/106 43/107 |
| D566,225 S * | 4/2008 | Cink | D22/122 |
| 7,412,797 B1 | 8/2008 | Hiscox | |
| 7,694,456 B1 * | 4/2010 | Curtis | A01M 1/106 43/122 |
| 8,028,467 B2 * | 10/2011 | Bagnall | A01M 1/04 43/113 |
| 8,356,444 B2 * | 1/2013 | Pazik | A01M 1/02 43/107 |
| 8,959,830 B2 | 2/2015 | McGavin | |
| 2004/0040198 A1 * | 3/2004 | Harris | A01M 1/106 43/107 |
| 2004/0231229 A1 | 11/2004 | Lenker | |
| 2005/0235554 A1 * | 10/2005 | Uhl | A01M 23/08 43/107 |
| 2006/0042154 A1 * | 3/2006 | Rich | A01M 1/10 43/107 |
| 2006/0137240 A1 * | 6/2006 | Dismore | A01M 1/103 43/107 |
| 2007/0151142 A1 * | 7/2007 | Suteerawanit | A01M 1/106 43/122 |
| 2007/0256351 A1 * | 11/2007 | Milton | A01M 1/08 43/139 |
| 2008/0263938 A1 | 10/2008 | Schneidmiller et al. | |
| 2009/0071060 A1 | 3/2009 | McKay | |
| 2009/0151228 A1 | 6/2009 | Schneidmiller | |
| 2012/0117855 A1 | 5/2012 | Miller | |
| 2012/0151822 A1 * | 6/2012 | Schneidmiller | A01M 1/106 43/107 |
| 2012/0294828 A1 | 11/2012 | Zhang et al. | |
| 2013/0152452 A1 | 6/2013 | Lazzarini et al. | |
| 2016/0157496 A1 * | 6/2016 | Nchekwube | A01N 25/006 424/84 |
| 2017/0073948 A1 * | 3/2017 | Terrell | A47K 1/14 |
| 2018/0042212 A1 | 2/2018 | McGavin | |
| 2018/0213765 A1 | 8/2018 | Liang | |
| 2019/0208759 A1 * | 7/2019 | Sanford | A01M 1/103 |
| 2020/0047996 A1 * | 2/2020 | Miller | B65F 1/16 |
| 2021/0137091 A1 * | 5/2021 | Dolshun | A01M 1/106 |

FOREIGN PATENT DOCUMENTS

| | | | |
|---|---|---|---|
| GB | 2274969 A | 8/1994 | |
| GB | 2328135 A | 2/1999 | |
| WO | WO-2019112831 A1 * | 6/2019 | A01M 1/02 |

OTHER PUBLICATIONS

Eneh, et al., "Cedrol, A Malaria Mosquito Oviposition Attractant is Produced by Fungi Isolated From Rhizomes of the Grass Cyperus Rotundus", In Malaria Journal, vol. 15, 4 pages.

Ellis, Christopher P., "Non-Final Office Action for U.S. Appl. No. 15/620,768", dated Feb. 8, 2019, 5 pages.

Uline, "Gamma Seal Lid for 2 Gallon Plastic Pail", Retrieved Date: Mar. 15, 2019, Retrieved at: <<https://www.uline.com/Product/Detail/S-20537/Pails/Gamma-Seal-Lid-for-2-Gallon-Plastic-Pail?pricode=WB0549&gadtype=pla&id=S-20537&gclid=EA . . . >>, 1 page.

Bull Run Scientific, VBT, "Heptyl Butyrate (100247) Fact Sheet", 2 pages.

\* cited by examiner

INSECT TRAP WITH MULTIPLE INSERTS

CROSS-REFERENCE TO RELATED APPLICATION(S)

The application claims the benefit of priority to U.S. provisional application 62/646,755, titled "A snap on or screw on plastic bucket lid with one or more plastic funnel cones designed to catch insects inside plastic buckets or containers," filed Mar. 22, 2018. This application is also a continuation-in-part of U.S. application Ser. No. 15/620,768, published as U.S. 2018/0042212, entitled "Insect Trap," filed on Jun. 12, 2017, which in turn claimed priority as a continuation-in-part to U.S. Design patent application No. 29/573,968, filed on Aug. 11, 2016, entitled "Bottle Mounted Flying Insect Trap." The entire disclosure of each of these prior applications is incorporated by reference herein.

FIELD

This disclosure relates to the field of traps for insects, and in particular traps for disease-carrying or annoying vector insects.

BACKGROUND

Disease vectors include biting or stinging insects that carry and transmit a pathogen into another living organism. Vector-borne diseases account for more than 17% of all infectious diseases, causing more than 1 million deaths annually. For example, more than 2.5 billion people in over 100 countries are at risk of contracting dengue alone, and malaria causes more than 400,000 deaths every year globally, most of them children under 5 years of age. Other diseases such as Chagas disease, leishmaniasis and schistosomiasis affect hundreds of millions of people worldwide. Many of these diseases are preventable through informed protective measures.

Disease vectors include living organisms that can transmit infectious diseases between humans or from animals to humans. Many of these vectors are bloodsucking insects, which ingest disease-producing microorganisms during a blood meal from an infected host (human or animal) and later inject it into a new host during their subsequent blood meal.

Mosquitoes are the best-known disease-carrying vector. Others include ticks, flies, sandflies, fleas, triatomine bugs and some freshwater aquatic snails.

Examples of mosquito-carried diseases include Chikungunya, Dengue fever, Rift Valley fever, Yellow fever, Zika, Malaria, Culex, Japanese encephalitis, Lymphatic filariasis, and West Nile fever. Examples of sandfly-carried diseases include Leishmaniasis and Sandfly fever (phelebotomus fever). Examples of tick-carried diseases include Crimean-Congo haemorrhagic fever, Lyme disease, Relapsing fever (borreliosis), Rickettsial diseases (spotted fever and Q fever), Tick-borne encephalitis, Tularaemia, and Chagas disease (American trypanosomiasis). Examples of tsetse fly-carried diseases include Sleeping sickness (African trypanosomiasis). Examples of flea-carried diseases include Plague (transmitted by fleas from rats to humans) and Rickettsiosis. Examples of black fly-carried diseases include Onchocerciasis (river blindness) and Schistosomiasis (bilharziasis).

Vector-borne diseases are illnesses caused by pathogens and parasites in human populations. Every year there are more than 1 billion cases and over 1 million deaths from vector-borne diseases such as malaria, dengue, schistosomiasis, human African trypanosomiasis, leishmaniasis, Chagas disease, yellow fever, Japanese encephalitis and onchocerciasis, globally. Vector-borne diseases account for over 17% of all infectious diseases. Distribution of these diseases is determined by a complex dynamic of environmental and social factors.

Globalization of travel and trade, unplanned urbanization and environmental challenges such as climate change are having a significant impact on disease transmission in recent years. Some diseases, such as dengue, chikungunya and West Nile virus, are emerging in countries where they were previously unknown. Changes in agricultural practices due to variation in temperature and rainfall can affect the transmission of vector-borne diseases. Climate information can be used to monitor and predict distribution and longer-term trends in malaria and other climate-sensitive diseases, and access to water and sanitation is a very important factor in disease control and elimination, as climate and sanitation are factors in vector populations.

Especially in insect-rich areas, the human desire to control insect populations has existed. Mosquitoes are among the most annoying insects, and the most desirable to control. Mosquitoes produce itchy red bites, create annoying buzzing sounds and may carry diseases such as malaria, dengue, West Nile virus, chikungunya, yellow fever, filariasis, Japanese encephalitis, Saint Louis encephalitis, Western equine encephalitis, Eastern equine encephalitis, Venezuelan equine encephalitis, La Crosse encephalitis and Zika fever.

Humans have also tried to control populations of houseflies, which carry disease and tend to hang out on our food, and wasps that are aggressive and produce painful stings when angered.

Control of insects is particularly desirable when individual humans or families have been indoor all winter and want to enjoy time outdoors in the summer. Not long after winter, when the melt water has pooled, the insects start to harass humans that are trying to enjoy fresh air.

There have been many attempts to curb insect populations such as bug-zappers that use ultraviolet light to attract the insects and an electrified grating to kill them. Sticky strips work for flies and wasps that are attracted to sweet flavors, wherein the sticky substance has an aroma of a sweet flavor and adheres to the leg or wing of an insect that comes near to consume it.

Lethal ovitraps are devices that attract gravid female container-breeding mosquitoes and kill them. The traps halt the insect's life cycle by killing adult insects and stopping reproduction. Lethal ovitraps can either contain substances that kills larvae that hatch from eggs laid in the traps (larvicidal ovitraps), or substances that kill the adult mosquito when she enters, along with any larva that may hatch (adulticidal ovitraps). One example in the industry comprises a large, five-gallon bucket that is somewhat complicated to use and clean. It uses a sticky tape to trap the mosquito.

Other compounds have been used to repel, but not kill, insects. Citronella candles keep mosquitoes away by masking scents that are attractive to them, such as carbon dioxide and lactic acid. DEET and picaridin are present within lotions and sprays to apply to the body to prevent mosquito bites. DEET may also be used but is objected to as a toxic chemical that has a strong smell and repulsive taste.

Insect traps are intended to retain, but not necessarily kill, the insect. There are a variety of insect traps on the market used to capture insects both indoors and outdoors. The vast majority of traps on the market are for outdoor use and use harsh smelling attractants, chemicals and sticky glues to capture insects. The indoor traps are typically made of thick stock paper with sticky glues, chemical foggers that fill space with chemicals that kill insects or sticky glues that are hung around homes or stuck to surfaces that insects randomly land on and become stuck to. However, chemical foggers are harmful to humans in the environment and sticky glues and paper are messy and inhumane.

Other traps are often not reusable, use glues, pesticides, insecticides, or electricity, and have limited use and high costs.

SUMMARY

In an embodiment, the plastic insect funnel cone lid converts common buckets into low cost, non-toxic, reusable insect traps. Furthermore, it may be modified to illuminate at a wavelength for day and night attraction of insects. In addition, the funnel cones can be injected with scent or pheromones to increase the attraction for the target insect.

In an embodiment, an insect trap is provided including an enclosure for holding insects and a conically-shaped insert for insertion into the enclosure. The insert includes apertures and a frusto-conical end. In one or more embodiments, the trap and/or trap insert may be made from a plastic or a polymer. Insect attracting scents may be injected or impregnated into the plastic or polymer. In one or more embodiments, a chemical exhibiting phosphorescence or photoluminescence material may be combined with the plastic and/or polymer.

DETAILED DESCRIPTION

Figure 1:
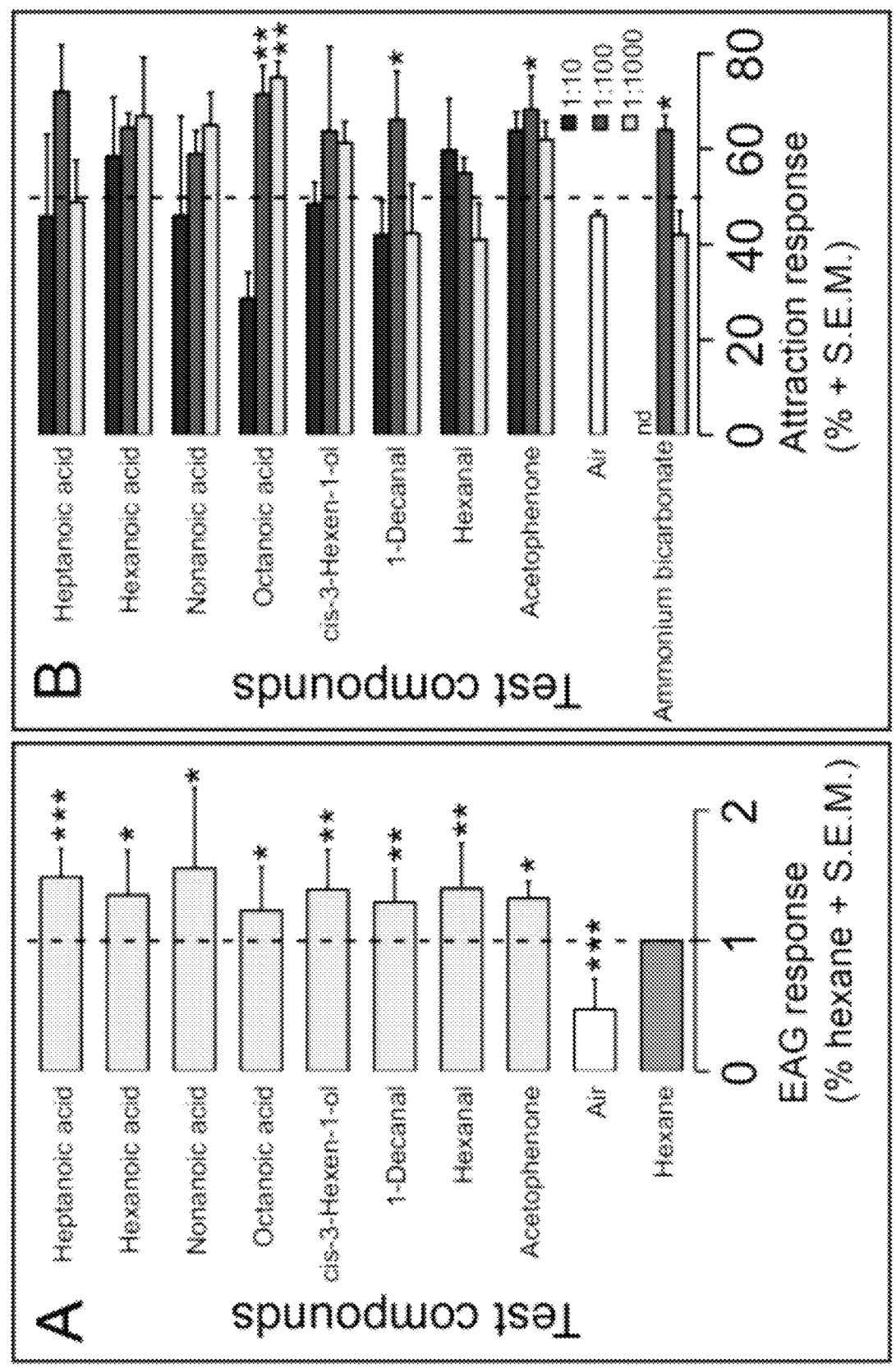
FIG. 1 is a graph showing attraction responses of vectors, according to an embodiment of the present invention.

Embodiments of the present invention and their advantages may be understood by referring to the Figures wherein like reference numerals refer to like elements.

Figure 3:
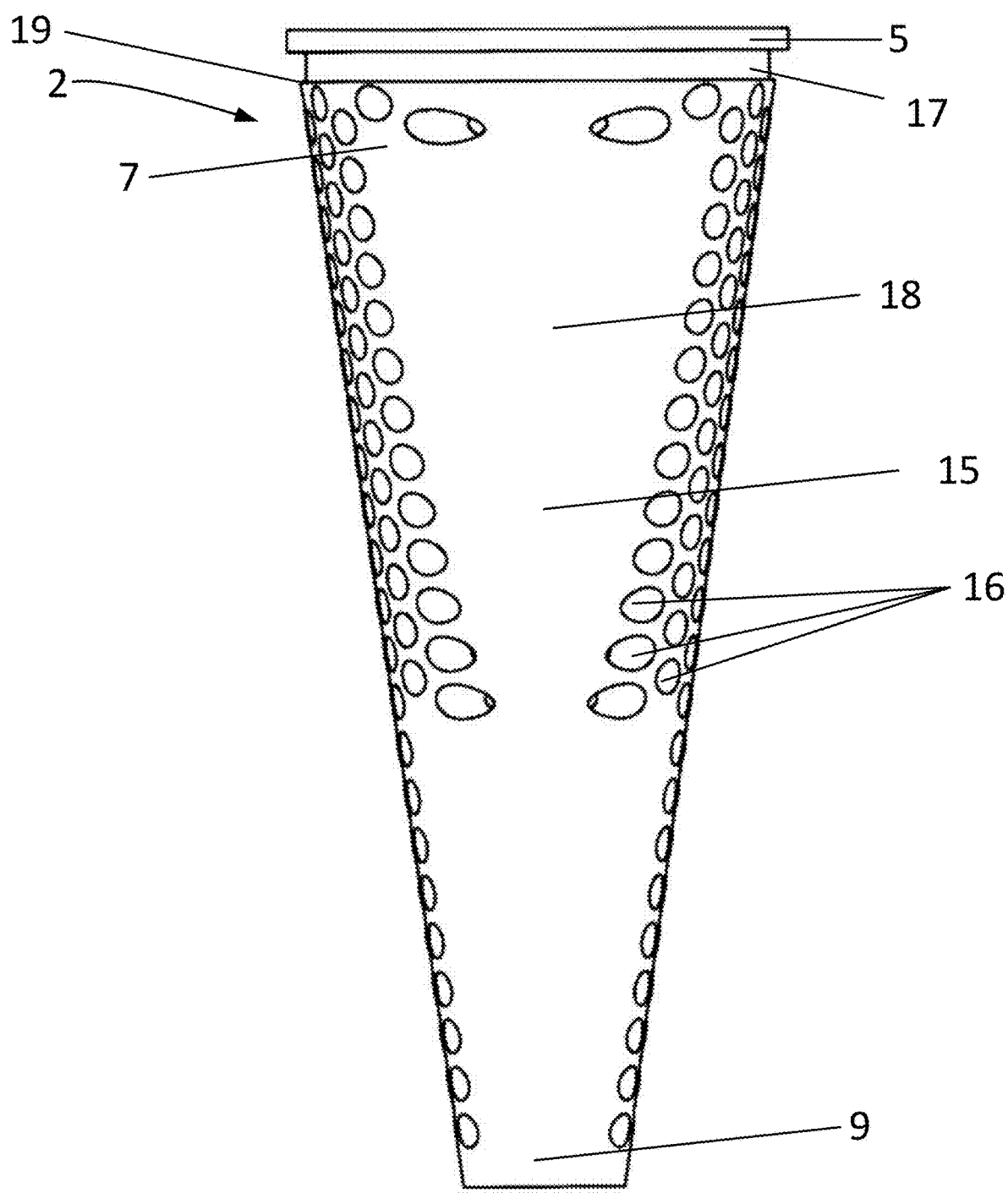
FIG. 3 is an elevation view of an embodiment of the insect trap.
Figure 4:
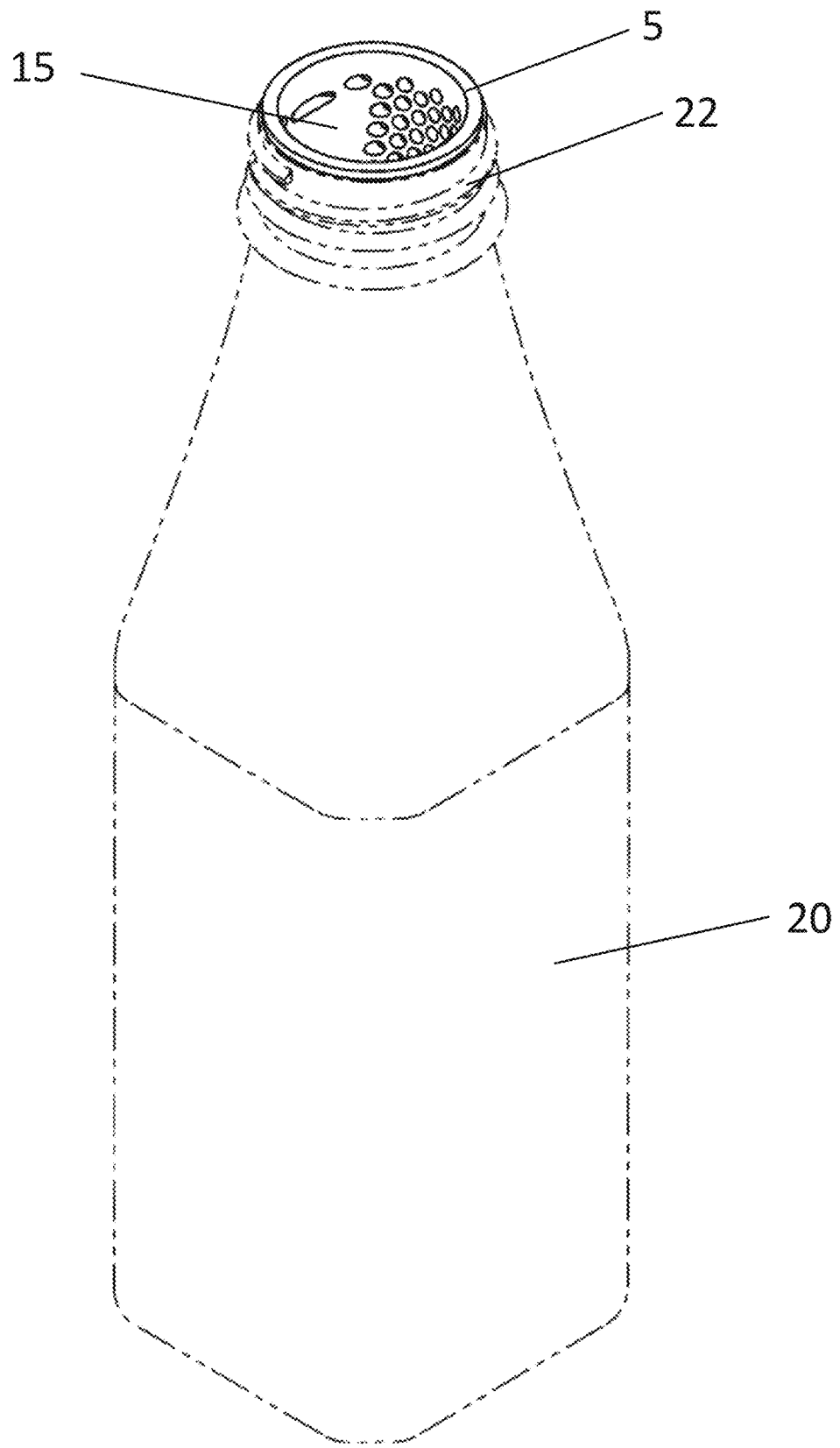
FIG. 4 is a perspective view of an embodiment of an insert trap within a bottle.

With reference to FIGS. 3 and 4, in an embodiment the insect trap cone 2 is conical in shape, with an upper opening 4 defined by an upper lip 5 at the top 7 of the cone 2. At the bottom 9 of the trap cone 2 is a lower opening 10 (shown in FIG. 6), smaller in diameter than the upper opening 4, also defined by a lower lip 12. The body 15 of the trap has a frusto-conical end which is decreasing in diameter to the bottom 9 of the trap. The sidewalls 18 of the body 15 are perforated with a plurality of apertures 16. The angle of the cone can vary as wells the length of the cone either longer or shorter depending on the size of the cavity and the target insect. In an embodiment, the entry opening and end opening of said cone should reflect a ratio of approximately 3 to 1 sizing, meaning an 38 mm entry opening would have approximately a 13 mm end opening. Other cone dimensional ratios are possible, from a longer, more slowly tapering cone to a shorter, more sharply tapered cone. Hole sizes in the smaller and larger cones would not change just increase or decrease in number to accommodate the container and the type of insect that is desirable. For example, a larger end opening would be used for a wasp than for a mosquito, and similarly the holes in the side of the cone would be small enough to prevent the escape of whatever insect the cone is designed to trap.

In an embodiment, the apertures 16 are selectively positioned to permit the insect to see inside the bottle but the sidewalls 18 are not entirely perforated.

In an embodiment, the collar 17 of the top 9 of the cone 2 is sized to provide a friction fit within the bottle opening 22 (shown in FIG. 6) and ledge 19 projects from the sidewalls 18 to engage with the interior of the bottle opening 22 (shown in FIG. 6), wherein the ledge 19 compresses as the cone 2 is inserted into the bottle opening 22.

The body 15 of the cone 2 may be conceptually separated into four quarters, each quarter representing a quarter circumference and extending from top 7 to bottom 9. In an embodiment, the apertures 16 on the walls 18 continue from top to bottom on two opposite quarters, but the intervening quarters are solid. The cone is designed to have a plurality of holes to allow for light and air transfer thus making the cavity opening more interesting and inviting as well as allowing for the fragrance from our bait lure to be more detectable. Some insects are curious by nature and having the plurality of holes is helpful in enticing them into and down the cone. In an embodiment, the cone traps may be efficiently manufactured by injection molding.

Figure 5:
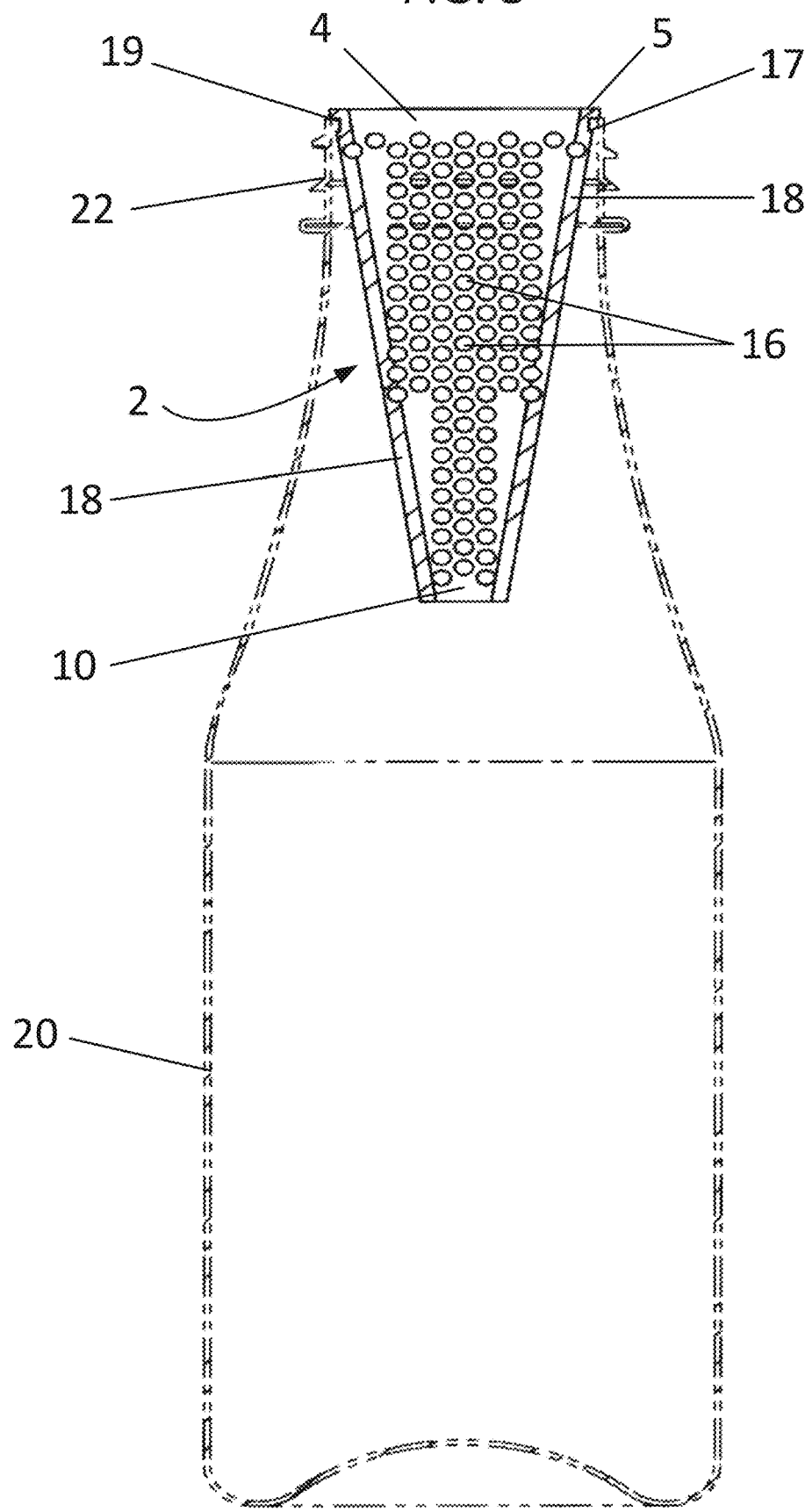
FIG. 5 is an elevation view of an embodiment of an insect trap within a bottle.
Figure 6:
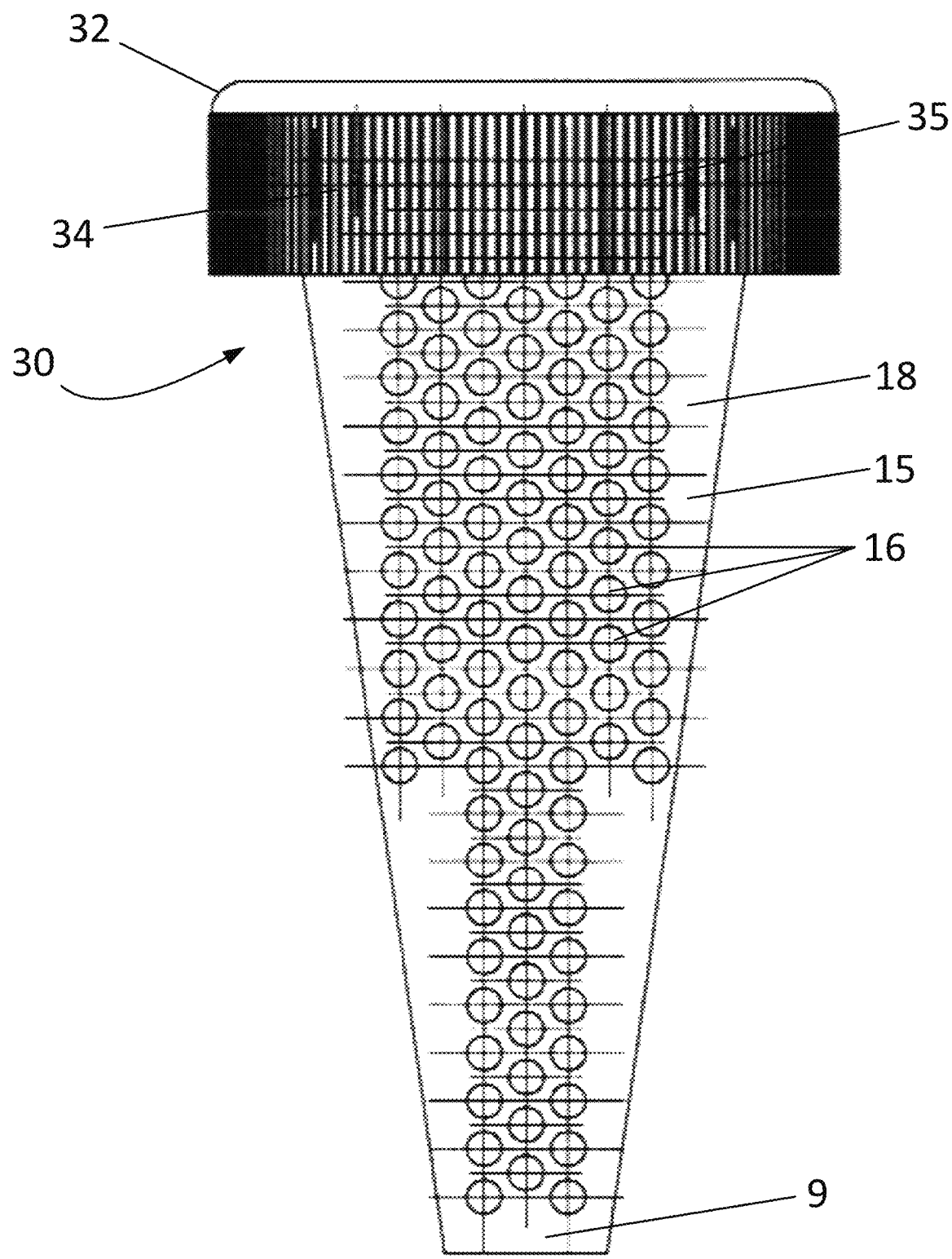
FIG. 6 is an elevation view of an embodiment of the threaded insect trap.
Figure 7:
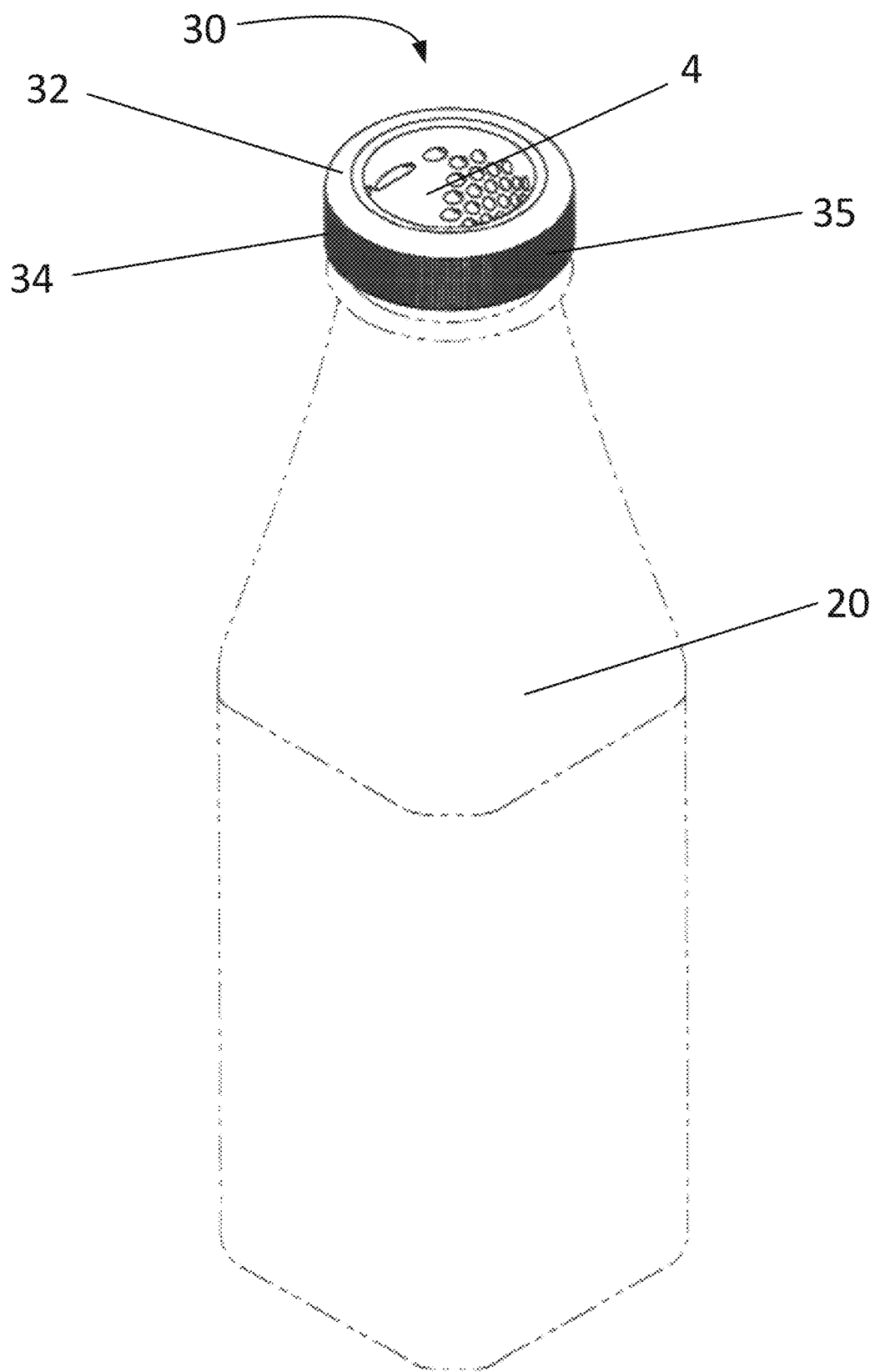
FIG. 7 is an elevation view of an embodiment of the threaded insect trap within a bottle.
Figure 8:
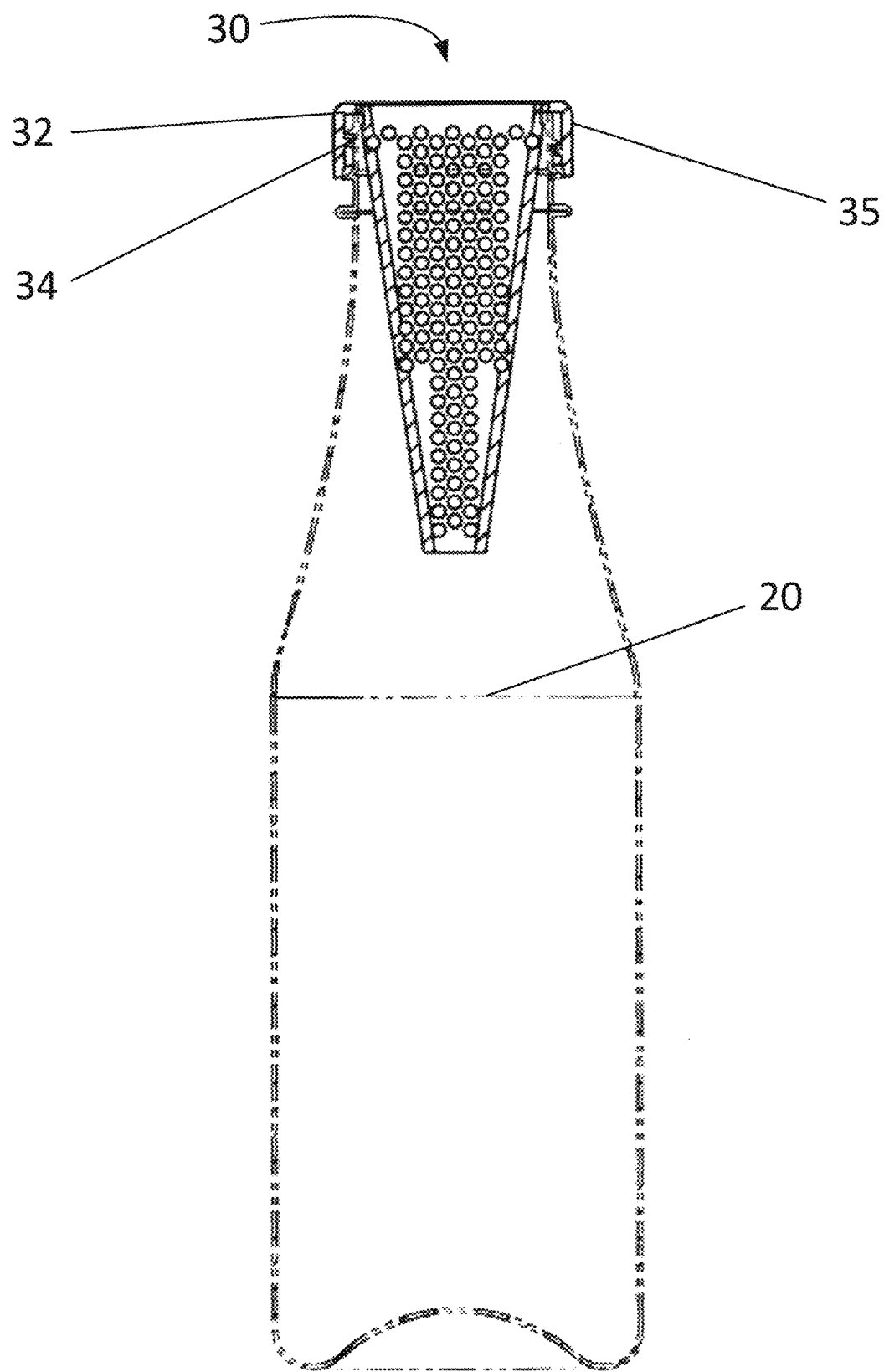
FIG. 8 is a cutaway view of an embodiment of the threaded insect trap within a bottle.

With regards to FIG. 5 and FIG. 6, the upper lip 5 is sized so as to be slightly larger than the interior diameter of a typical bottle opening 22. The upper lip 5 fits over the edge of the bottle opening 22, and the body 15 of the trap is inserted into the bottle 20. When inserted, the ledge 19 and collar 17 compress to engage with the inside wall of the bottle opening 22 to keep the trap within the opening.

With reference to FIGS. 6-9, a further embodiment of the cone 30 engages with the threads of the bottle opening 22. It has a lip extension 32 extending out from, and hanging over, the collar 17, having threading inside the lip extension, to positively engage with threading around the bottle opening 22. On the exterior wall 34 of the extension 32 may be knurled 35 to help provide a grip in turning the cone 30.

The friction fit embodiment of the cone as well as the threaded embodiment are designed to allow bait or lure to be placed in plastic bottle or container, prepackaged, and sealed with a paper or plastic liner or wrapper, and/or additional seal, like a foil heat seal, over the upper opening 4. In an embodiment, the final product may be manufactured of a bottle 20 with approximately 1 ounce of non-toxic sugar base bait (not shown) in the bottle 20, a snap in cone 2 or screw in funnel cone 30 set within the bottle opening 22, and a plastic or paper layer sealed with a heat induction cap over the cone upper opening 4.

The trap may be made from materials (typically plastics) that enable addition of optical properties (including light) and scents.

With regards to optical properties, phosphorescence or photoluminescence is beneficial to attracting attention of insects during the day and at night. A chemical that produces phosphorescence is strontium aluminate, which may be combined into plastics, for example Polypropylene, polyethylene, PVC, EVA, PET, HDPE, to provide phosphorescence for a prolonged period. For many phosphorescent-based purposes, strontium aluminate is a vastly superior phosphor to its predecessor, copper-activated zinc sulfide (ZnS:Cu); it is about 10 times brighter and 10 times longer glowing, however it is about 10 times more expensive than ZnS:Cu and it cannot produce the unique red phosphorescence of the latter. It is frequently used in glow in the dark toys, where it displaces the cheaper but less efficient ZnS:Cu.

Different aluminates can be used as the host matrix. This influences the wavelength of emission of the europium ion. Strontium aluminate phosphors produce green and aqua hues, where green gives the highest brightness and aqua the longest glow time. The excitation wavelengths for strontium aluminate range from approximately 200 to 450 nm. The wavelength for its green formulation is approximately 530 nm, its blue-green version emits at approximately 505 nm, and the blue one emits at approximately 490 nm. Colors with longer wavelengths can be obtained from the strontium aluminate as well, though for the price of some loss of brightness.

Zinc sulfide, an older technology, may be used instead of strontium aluminate, also in combination with certain plastics.

Color is also an optical property that may be controlled in the material of the trap. A number of wavelengths of light are particular attractive to insects, comprising colors commonly understood as yellow/green and blue, most frequently appearing between 400 nm and 600 nm frequency. Preferred wavelengths for attractiveness for mosquito populations are green (530 nm), blue (490 nm) and white (combination of 400-700 nm) LEDs. The traps may therefore be manufactures of plastics that provide similar, desirable optical qualities. Phlebotominae (sand fly) may be a target insect of interest for the trap as well, and is highly attracted to light, both green 520 nm and blue 490 nm, therefore traps designed to attract this fly will incorporate these wavelengths.

Certain scents are attractive to insects and may be injected or impregnated into plastic, for example, but not limited to, Polypropylene, polyethylene, polyvinyl chloride (PVC), ethylene-vinyl acetate (EVA), polyethylene terephthalate (PET), and high-density polyethylene (HDPE) to provide an emanation of the scent for a prolonged time period. Fragranced plastic is used in toys, air fresheners, film products, odor maskants, advertising promotional items, and other applications. The masterbatches are used in injection molding and film processes as supplied or diluted with virgin resin. Application resins include polyethylene, polypropylene, EVA, and flexible PVC.

Heptyl butyrate may be used as a lure or injected into the plastic. In a lure embodiment, the heptyl butyrate is in a foil package that allows the scent to elute through the packaging. This provides a long lasting, metered scent.

Carbon Dioxide or $CO_2$ is known attractive lure for vectors specifically mosquitoes. Two known methods for naturally creating carbon dioxide are the combination of sugar, yeast and water as well as baking soda and vinegar, therefore these components may be added into the bottle to help attract vectors.

Octynol, also known as mushroom alcohol, is also attractive to mosquitoes. It is naturally-occurring in human breath and sweat. 1-Octen-3-ol is a secondary alcohol derived from 1-octene. It exists in the form of two enantiomers, (R)-(−)-1-octen-3-ol and (S)-(+)-1-octen-3-ol. Octynol compounds can be impregnated into liquid plastic (polypropylene) in order to release the scent at a slow rate from the molded plastic insect trap. If made of other materials, the substances may be added to the materials.

Cyclopentanone is a proven attractant for mosquitoes, flies and other flying insects including vectors and may also be integrated into the plastic material of the cone.

Another compound that acts as an attractant to flies and bees and may be impregnated into plastic is (Z)-9-Tricosene, a sex pheromone produced by female house flies (*Musca domestica*) to attract males. In bees, it is one of the communication pheromones released during the waggle dance. As a pesticide, (Z)-9-tricosene is used in fly paper and other traps to lure male flies, trap them, and prevent them from reproducing. Products containing (Z)-9-tricosene are considered safe for humans, wildlife, and the environment, and may be added to the material of the insect trap for a slow release of the pheromones from the insect trap.

Sweat is also attractive to insects like mosquitos and other vectors, and particular compounds may be especially attractive to vectors, and may be impregnated into the plastic of the trap. Dissolved in the water are trace amounts of minerals, lactic acid, and urea. Although the mineral content varies, some measured concentrations are: sodium (0.9 gram/liter), potassium (0.2 g/l), calcium (0.015 g/l), and magnesium (0.0013 g/l). Also, many other trace elements are excreted in sweat, again an indication of their concentration is (although measurements can vary fifteenfold) zinc (0.4 milligrams/liter), copper (0.3-0.8 mg/l), iron (1 mg/l), chromium (0.1 mg/l), nickel (0.05 mg/l), and lead (0.05 mg/l). Probably many other less-abundant trace minerals leave the body through sweating with correspondingly lower concentrations. Some exogenous organic compounds make their way into sweat as exemplified by an unidentified odiferous "maple syrup" scented compound in several of the species in the mushroom genus *Lactarius*. In humans, sweat is hypoosmotic relative to plasma (i.e. less concentrated). Sweat typically is found at moderately acidic to neutral pH levels, typically between 4.5 and 7.0. The components of sweat may be added to the plastic composition of the insect trap in order to better attract vectors. These include the following compounds identified from humans or bovine, identified in various locations, such as human sweat, skin, groin, arm, armpit, feet; or human or bovine rumen): Putative kairomones selected for EAG study of *Simulium* spp., such as, carboxylic acids, alcohols, aldehydes, alkanes, and ketones. Carboxylic acids include, for example: heptanoic acid, lactic acid (attractive to *Anopheles gambiae*), octanoic acid, hexanoic acid (attractive to *stomoxys calcitrans* and *An. gambiae*), nonanoic acid, isobutyric acid (attractive to *S. calcitrans*), 4-Methoxybenzoic acid, DL-Serine, tetradecanoic acid, octadecanoic, hexadecanoic acid, adipic acid, isophthalic acid, isovaleric acid (attractive to *S. calcitrans*), propionic acid (attractive to *S. calcitrans* and *An. gambiae*, butyric acid (attractive to *S. calcitrans* and *An. gambiae*), pentadecanoic acid, decanoic acid, undecanoic acid, tridecanoic acid, linoleic Acid, 2-Methylhexanoic acid, and oleic acid. Alcohols include, for example: tetrahydrofurfuryl alcohol, 3-octanol (attractive to *S. calcitrans*), 1-octen-3-ol, *S. calcitrans,* 2-ethyl-1-hexanol (attractive to *S. calcitrans*), cis-3-hexen-1-ol, *S. calcitrans,* 1-octanol (attractive to *S. calcitrans*), 1-decanol, 1-heptadecanol, 1-pentadecanol, 1-tetradecanol, 2,4,4-trimethyl-1-pentanol, 1-octadecanol. Aldehydes include, for example, nonanal (attractive to *Am. variegatum* and *culex quinquefasciatus*), hexanal (attractive to *Am. Variegatum*), Tetrahydro-2-furancarboxaldehyde (attractive to *Am. Variegatum*), decanal (attractive to *stomoxys calcitrans, Cx. Quinquefasciatus,* and *Am. Gambiae*), and 1-Pentadecanal. Alkanes include, for example: pentadecane, undecane, heptadecane, and hexadecane. Ketones include, for example: (+/−)-dihydrocarvone (attractive to *S. calcitrans*), methyl acetoacetate, 6-methyl-3-hepten-2-one (attractive to *S. calcitrans,* An. *gambiae*), 6,10-Dimethyl-5,9-undecadien-2-one, sodium pyruvate, 4-methoxy-2H-chromen-2-one, acetophenone (attractive to *S. calcitrans*). Other compounds include, for example: 3,6-dimethylphthalic anhydride, 3-methyl indole, R-(+)-limonene (Attractive to *S. calcitrans*), Cedryl acetate, Urea (ammonia) (attractive to *Aedes aegypti*). These compounds are further examples of compounds that may be used within the plastic or other components of the insect trap, so as to be released slowly and attract insects (vectors).

A particular compound that may be added to the material of the insect trap is acetophenone, an organic compound with the formula $C_6H_5C(O)CH_3$ (also represented by the letters PhAc or BzMe). It is the simplest aromatic ketone. This colorless, viscous liquid is a precursor to useful resins and fragrances. It is particularly attractive to certain species of mosquitoes.

Some vectors are attracted to nectars, and sugars and nectars may be inserted into the trap. Vectors can and may be impregnated or injected into the plastic of the cone itself, before molding. Examples of scents that may be impregnated are mango, agave, apple and Cedrol oil.

Nectar is a sugar-rich liquid produced by plants in glands called nectaries, either within the flowers with which it attracts pollinating animals, or by extrafloral nectaries, which provide a nutrient source to animal mutualists, which in turn provide antiherbivore protection. Common nectar-consuming pollinators include mosquitoes, hoverflies, wasps, bees, butterflies and moths, hummingbirds, and bats. Nectar plays an important role in the foraging economics and overall evolution of nectar-eating species; for example, nectar and its properties are responsible for the differential evolution of the African honey bee, A. m. scutellata and the western honey bee.

Nectar is an ecologically important item, the sugar source for honey. It is also useful in agriculture and horticulture because the adult stages of some predatory insects feed on nectar. For example, the social wasp species *Apoica flavissima* relies on nectar as a primary food source. In turn, these wasps then hunt agricultural pest insects as food for their young.

Attractive Sugar Baits (ASB) may be used to attract vectors such as flies, yellow jacket wasps, hornets, wasps, mosquitos and other vectors and flying insects. These may be food grade sugar based, safe for use around children and pets, and in food preparation areas. The prior art discloses Attractive Toxic Sugar Baits, however toxins may have adverse affects on the health of humans or animals. Toxins are not necessary in the present invention as the invention traps the insect inside, however the ASB can be positioned within the trap to increase the attractiveness of the interior of the trap. In an embodiment, a disposable bottle trap is pre-baited with our non-toxic ASB bait and sealed with tamper proof seal. Our reusable window trap includes a bottle of non-toxic ASB bait for use at time of placement.

Mango and Agave scents are particularly of interest based on multiple tests, wherein the nectar based fruit scents proved to be attractive and sweet. Floral scents are also beneficial to attracting vectors and sweet scents also work to attract vectors.

Cedrol, a sesquiterpene alcohol, is the first identified oviposition attractant for African malaria vectors. Cedrol may be a fungal metabolite and the essential oil of grass rhizomes have been described to contain a high amount of different sesquiterpenes. Cedrol is an attractant to vectors and may be combined/integrated into the cone material.

The snap in or screw in cone is designed to be used with plastic bottles (PET, HDPE, PP, PLA, PVC) ranging in bottle neck size diameters of 18 mm, 20 mm, 22 mm, 24 mm, 28 mm, 33 mm, 38 mm, 43 mm, 45 mm, 48 mm, 53 mm, and 58 mm. (The listed diameters are possible end points for the range.)

FIGS. 9-15 illustrate another embodiment of the insect trap designed for outdoor or indoor use, with a substantially enhanced capacity for catching insects. The funnel cone trap insert can be paired with a lid and a matching bucket or container. The modified lid can convert a common-sized bucket or container into low cost, non-toxic, reusable, high capacity insect trap. In contrast to the bottle embodiment, the bucket lid embodiment allows for a much higher capacity of insects to be trapped with more cones for catching insects, a higher bait capacity. The bucket embodiment also is sturdier, reusable, easily cleanable, and less prone to tipping over. The term "bucket" as used herein includes containers with a top opening, sidewalls, and a closed bottom. The bucket can be, but is not necessarily, cylindrical. The bucket can have a handle or no handle. A In an embodiment, the insect trap is modified to illuminate at a wavelength for day and night attraction of insects. In addition, the funnel cones can be injected with scent or pheromones to increase the attraction for the target insect.

Figure 2:
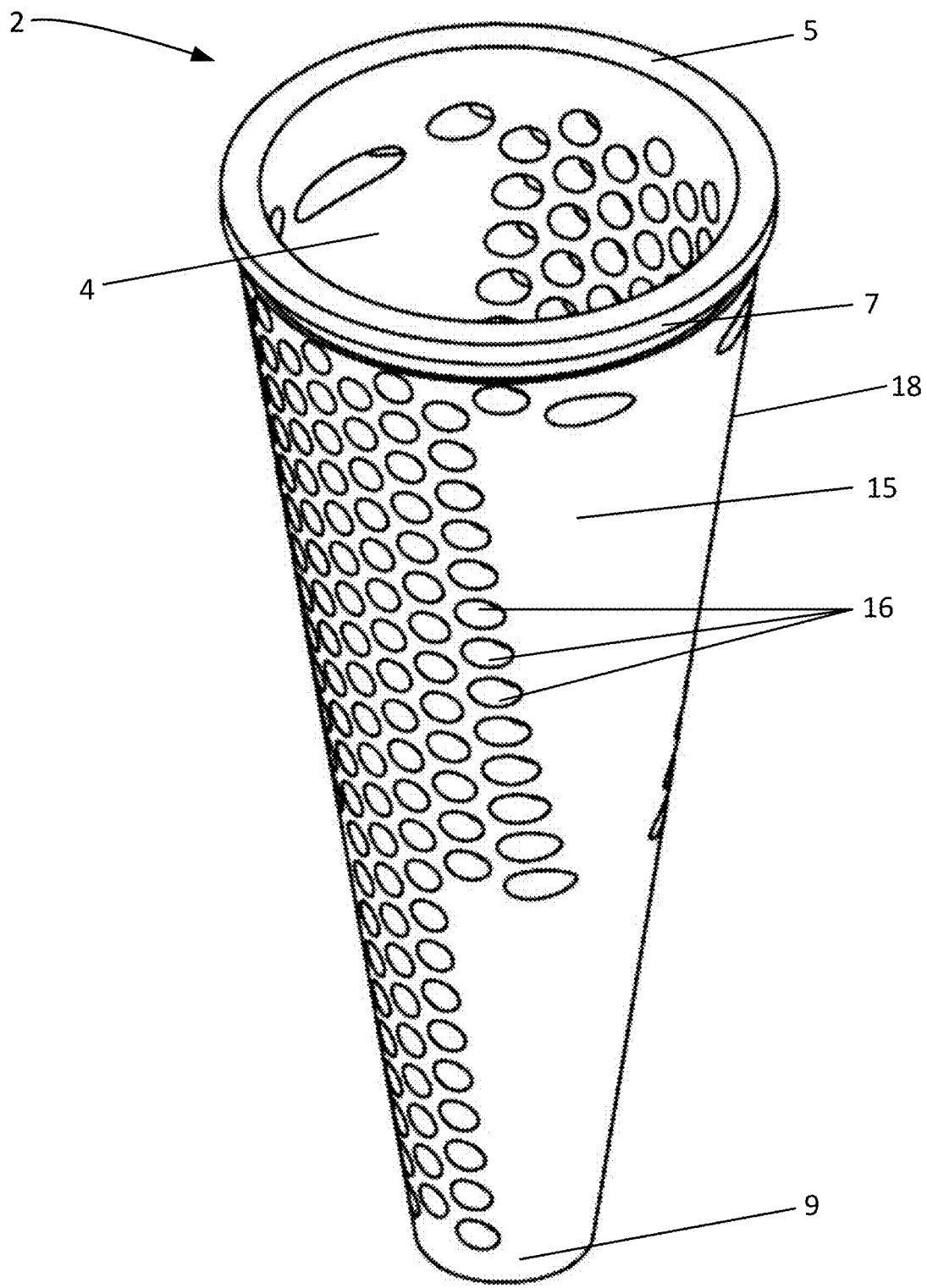
FIG. 2 is a perspective view of an embodiment of an insect trap showing attraction responses of vectors.

FIGS. 9-12 show several views of an embodiment of the bucket lid trap 101, wherein the lid 109 is configured to screw onto a container, in this case a bucket 110. The bucket lid trap 101 is assembled as follows: the snap bucket ring 108 snaps onto the top opening of the bucket 110. Five funnel cones 107 snap into openings 111 through the top of the lid 109. The lid 109 twists onto the snap bucket ring 108. By "snap" it is meant a press fit that held in place by friction or a press fit wherein a ridge or protrusion is pushed in and holds the main part into place. The funnel cones 107 terminate in a center area of the bucket 110, with the bottom end 9 and terminal opening 10 (See FIGS. 2, 3, and 6) of the cone 107 pointing to a base of the bucket that rests on the ground. The terminal opening 10 is spaced away from the sidewalls of the bucket 110, which contributes to making escape from the bucket 110 unlikely for the insect.

The snap bucket ring 108 includes a helical ridge 115 on its inner surface that is configured to receive a matching helical ridge 117 on an outer surface of the lid 109. The snap bucket ring also includes a seal 120, such as an o-ring seal 120 that seals the bucket 110 and allows insects to only enter the bucket from the funnel cones 107 and not exit. The snap bucket ring 108 includes a wrap-around lip 125 with flared end 127, wherein the seal 120 is contained in the interior of the wrap-around lip 125. The snap bucket ring 108, snaps into place when it is pushed down onto a lip 119 of the bucket 110 and the lip 119 engages the seal 120 of the snap bucket ring 108.

Figure 9:
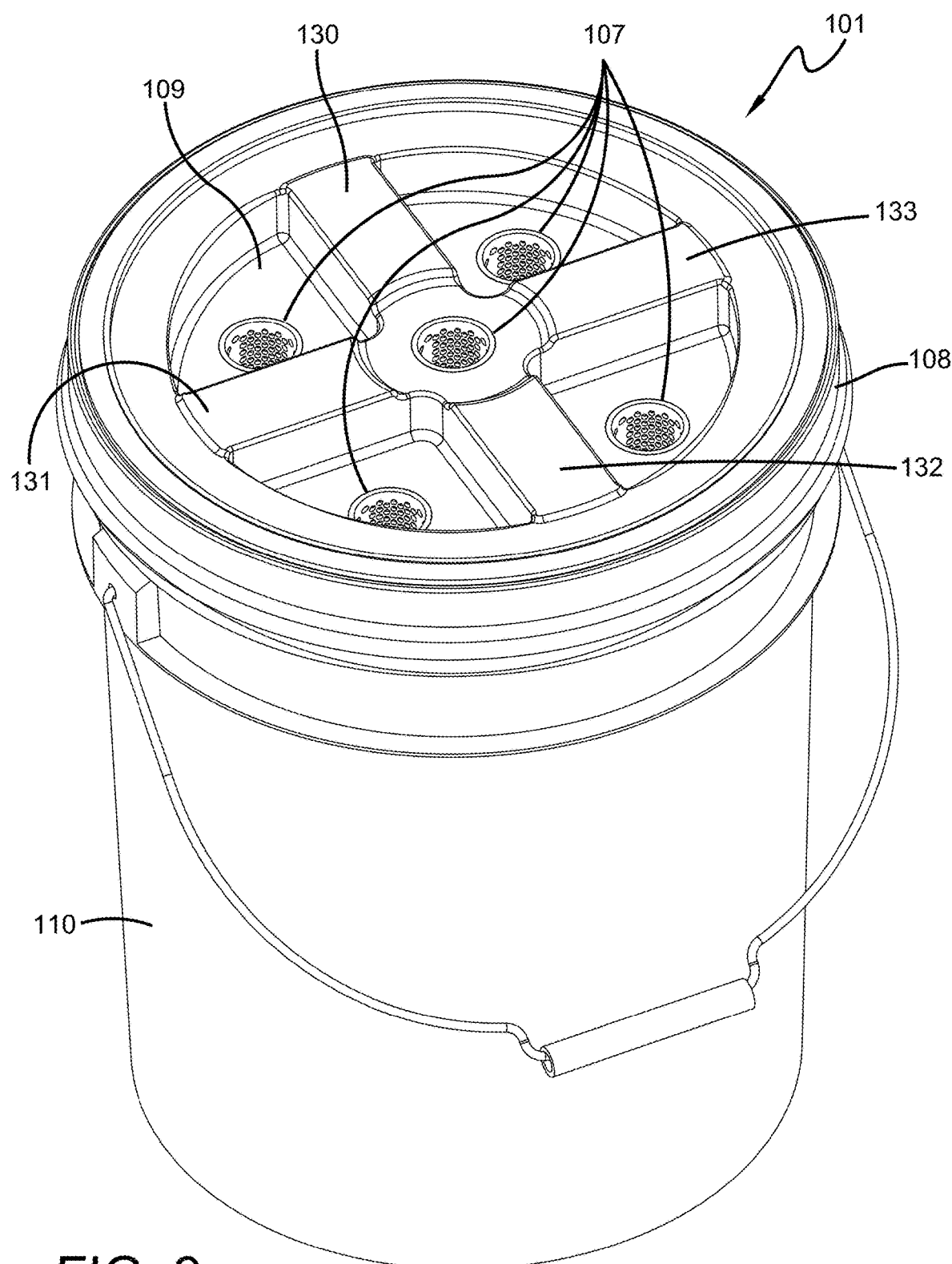
FIG. 9 is a perspective view of a twist on lid with funnel cones attached, and the lid attached to a bucket.
Figure 10:
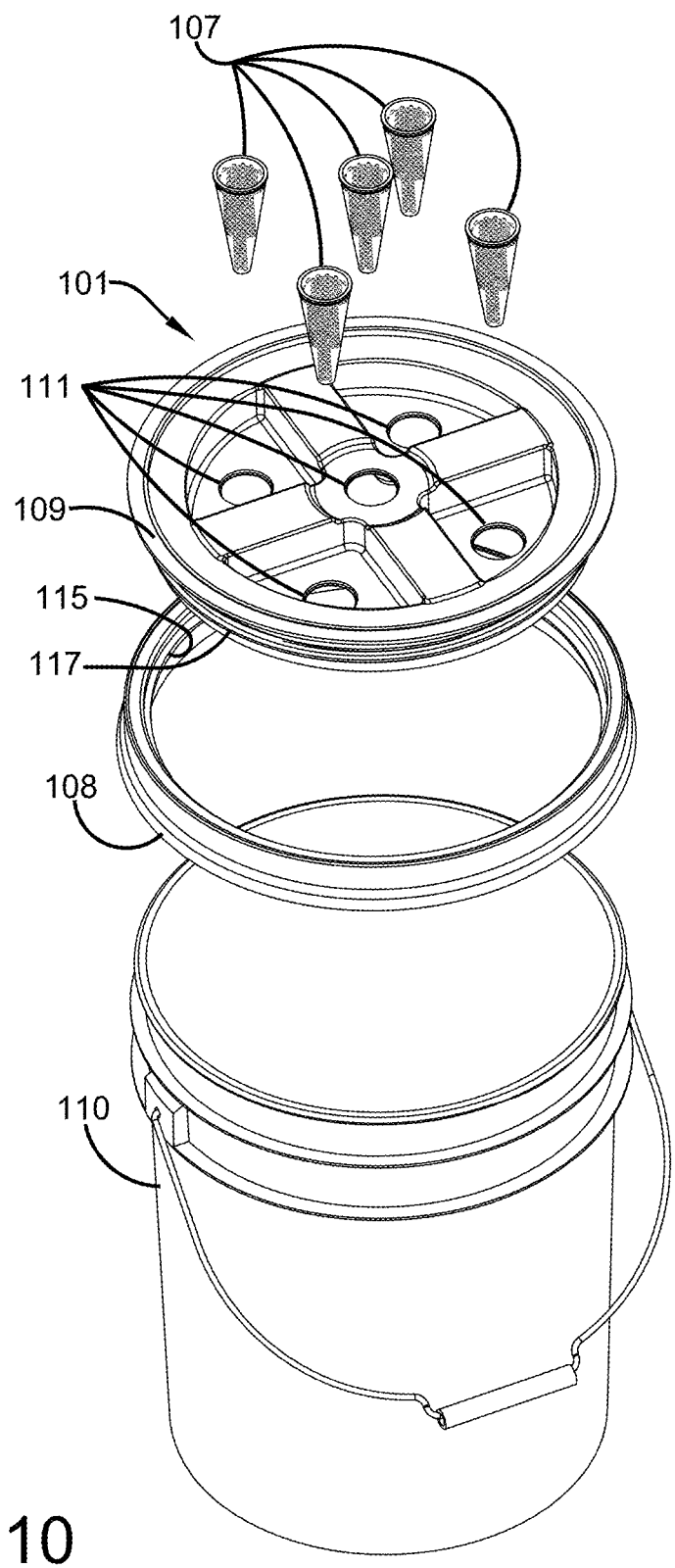
FIG. 10 is an exploded perspective view of an embodiment of an insect trap with a screw-on lid with funnel insect trap cones, a snap-on ring, and a bucket.
Figure 11:
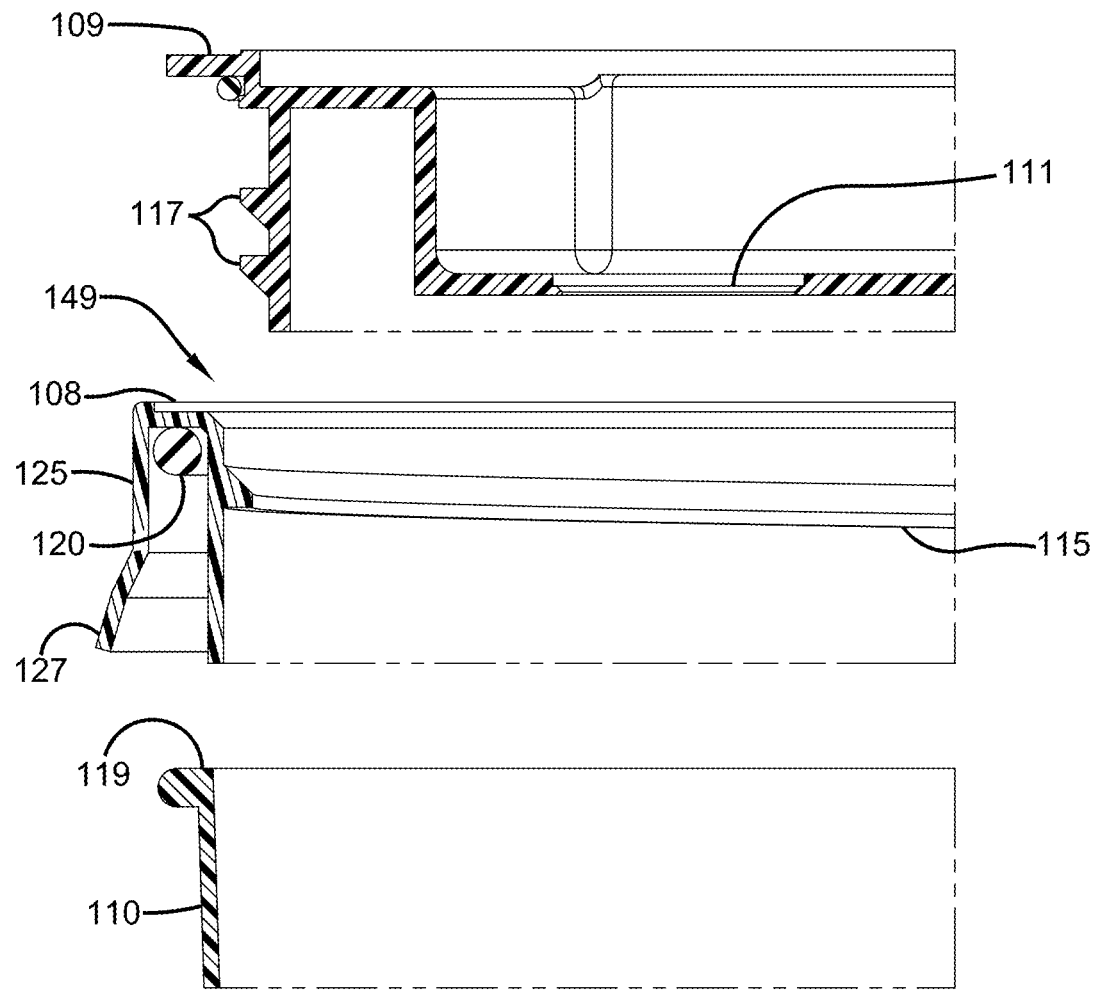
FIG. 11 is a cross-sectional, exploded, partial view of an embodiment of the insect trap of FIG. 10 without the insect trap cones.
Figure 12:
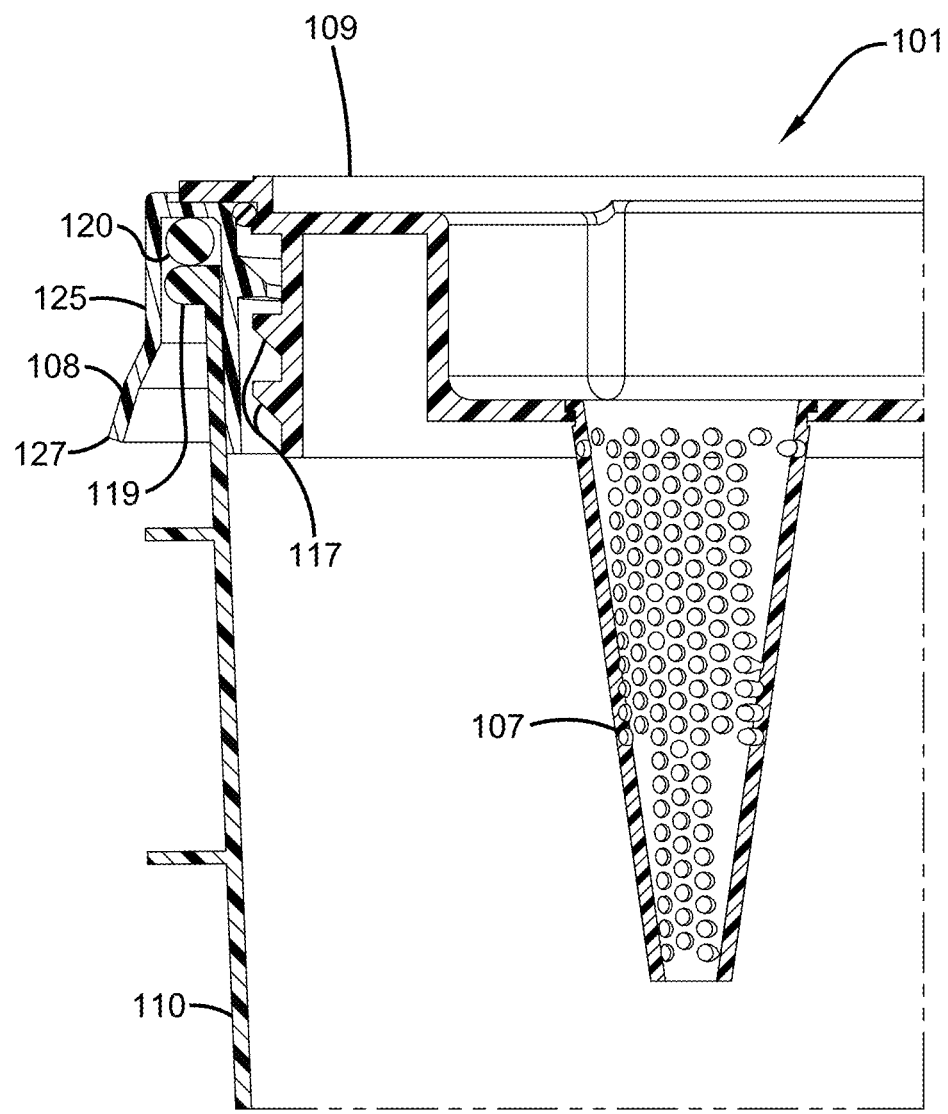
FIG. 12 is a cross-sectional, partial view of an embodiment of the screw-on insect trap of FIG. 10 with an insect trap cone.

The lid 109 has a top and bottom and includes several openings 111 that extend through the top of the lid 109. In an embodiment, as shown in FIG. 9, projections 131-133 from a base of the lid 109 provide reinforcing strength to the lid 109 and provide a surface by which a torque can be applied by a user to screw the lid 109 off or on to the snap bucket ring 108. Inserts 107 extend from the top of the lid 109 through the lid 109 and to a bottom side of the lid 109. The inserts 107 have a terminal opening 10 (See FIG. 5) that terminates on the bottom side of the lid 109. The lid 109 attaches to the bucket 110 through the snap bucket ring 108. The lid 109 is twisted or screwed down clockwise by matching the helical ridge 117 with the matching helical ridge 115 of the snap bucket ring 108.

The plastic funnel cones 107 may be the same as the cones 2, 30 described above and pictured in FIGS. 2, 3, 5, 6, and 8, either cone 2 (snap fit) or cone 30 (with threads) can be used. In the latter case, the lid openings 111 would be provided with matching threads on an interior surface to receive the threads on the cone 30. Notably, the plastic funnel cones are perforated with small holes, and have an open bottom terminal end, sized to admit one or more targeted insects. The bottom 9 of the cone 2 is not sharp or spiked but smooth. In an embodiment, there are 2 to 50 cones, such as 3 to 12, or 4 to 8 attached to the lid in the manner shown in the FIGS. 9-15, spaced approximately equidistant. The funnel cone design is dimensioned so as to allow insects to enter and not exit the bucket 110. Examples of some of the many species of insects the bucket lid trap 101 can be used to control include: mosquitos, flies, gnats, yellow jackets, hornets, wasps, gnats, ants, beetles, stink bugs. The holes and other dimensions of the funnel cone design may be varied to target specific insects, based on their size and shape, for example the side hole diameters may range from, 4 to 21 gauge, 8 to 18 gauge, or 12 to 16 gauge. The side holes should not be so large that the target insect could enter the hold and escape the trap. The size of the terminal opening 10 at the bottom of the funnel cone can be larger or smaller in diameter than what is shown in the figures, such as, for example, 6 mm to 26 mm, 8 mm to 20 mm, or 10 mm to 15 mm. The length of funnel cones can be longer or shorter than what is shown in the figures, such as, for example, 1 to 10 inches, 2 to 8 inches, or 2.5 to 4 inches long.

For using the cone 2 with an ant trap, to catch ant species such as, for example, fire ants, sugar ants, carpenter ants, and argentine ants, the container associated with the cone 2 should have a medium that drowns or otherwise kills the ant. The cone 2 guides the ants to the middle of the medium, away from the sides where they might escape.

Figure 13:
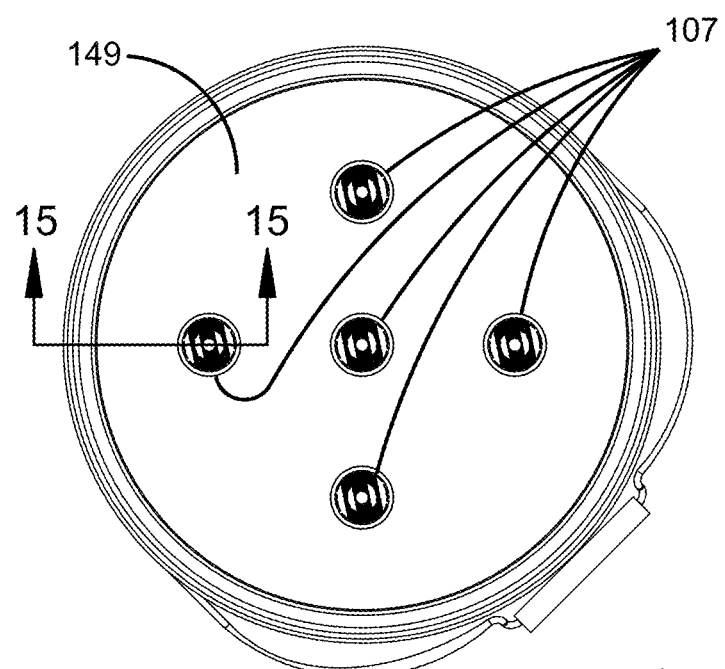
FIG. 13 is a top down view of a snap-on lid with insect traps.
Figure 14:
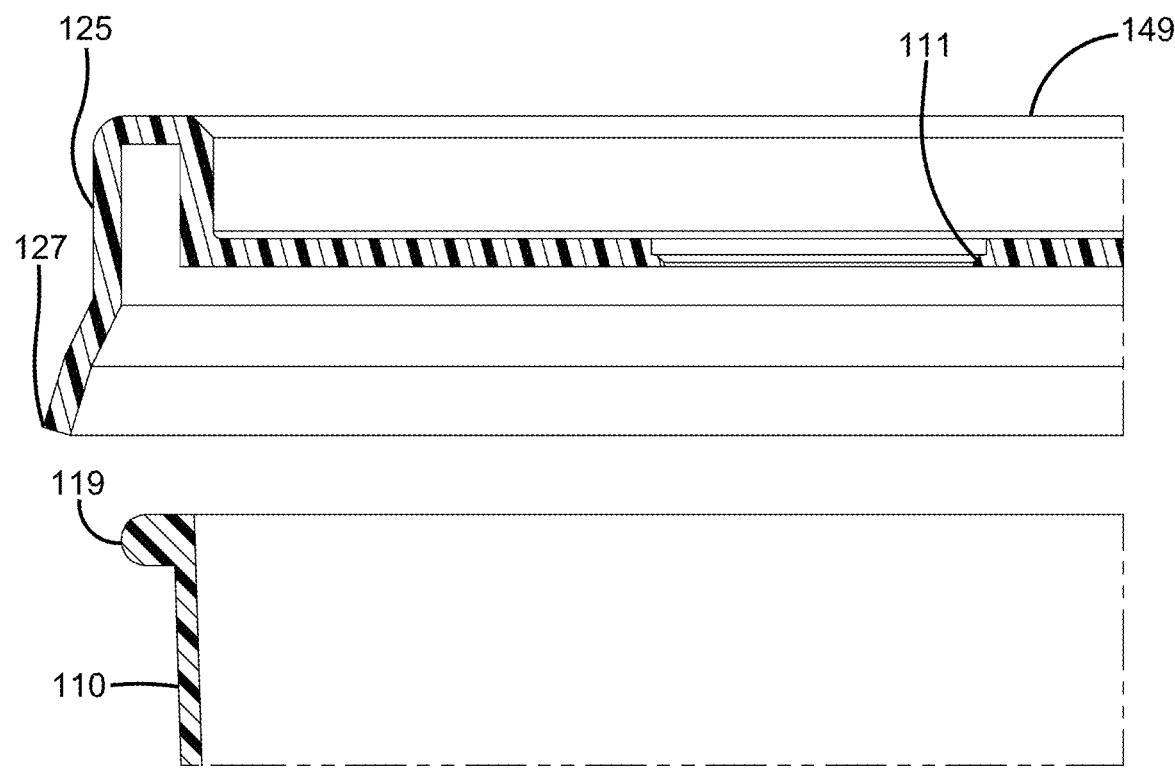
FIG. 14 is a cross-sectional, exploded, partial view of an embodiment of the insect trap of FIG. 13 without the insect trap cones.
Figure 15:
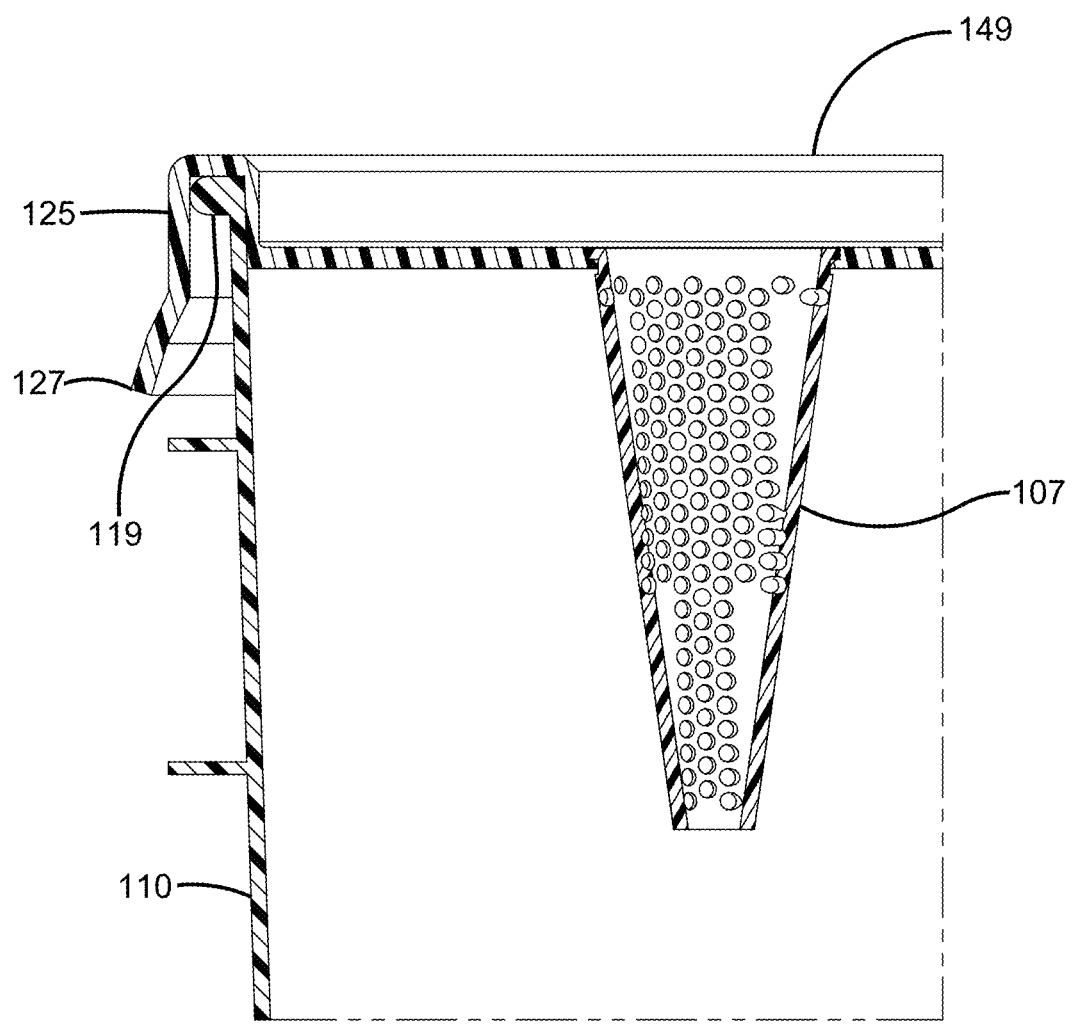
FIG. 15 is a cross-sectional, partial view of an embodiment of the insect trap of FIG. 13 with an insect trap cone.

FIGS. 13-15 disclose a two membered embodiment consisting of a snap-fit lid 149 and a bucket 110 as described above. Instead of screwing onto a snap bucket ring 108, as in FIGS. 9-12 above, the snap-fit lid 149 snaps directly onto the lip 119 of the bucket 110. In this embodiment, the snap-fit lid 149 includes a wrap-around lip 125 with a flared end 127. Optionally, a seal 120 is contained in the interior of the wrap-around lip 125. For certain embodiments, the seal 120 is not required.

In operation, a lure, such as, one or more of a sugar-based bait, meat, fish, heptyl butyrate, pheromones, and other proven insect attractants can be used in the bucket or container to increase the effectiveness of attracting the insects to the insect bucket lid 109 and then into the funnel cone 107 and bucket 110. The insects are retained in the bucket 110 until they die. The bucket 110 has a high capacity for retaining and killing a large number of insects.

The bucket 110 can be emptied, optionally rebaited and reused. In embodiments with attractants (light or scent) impregnated or injected, e.g. molded into the plastic, rebaiting is not necessary. This feature makes the trap particularly low-maintenance and cost-effective. Advantageously, the bucket lid trap 101 is easy to clean. To clean the bucket lid trap 101, the bucket lid 109 is turned counter clockwise and dead insects and bait are emptied, such as by turning the bucket 110 upside-down. The bucket 110, snap bucket ring 108, funnel cones 107, and lids 109, 149 can be sprayed out if needed.

Advantageously, the bucket lid trap 101 provides a low cost insect trap that can be combined with many currently available buckets and containers. Buckets ranging from 1 quart to 5 gallons, 1 gallon to 7 gallons, or even 10 gallon to 50 gallon drums (also generically titled buckets) can be used with an embodiment of the lids described herein. The bucket lid trap 101 can be a non-toxic, reusable insect trap for both indoors and outdoors.

In an embodiment, the twist-on and snap-on lids 109, 149, the funnel cones 107 and snap bucket ring 108 can be made of polymeric material, such as plastics, by, for example, injection molding or blow molding manufacturing methods. In an embodiment, the funnel cones 107 can be made luminescent with a phosphorescent or photoluminescent agent, such as either a zinc sulfide or a strontium aluminate compound. These compounds can be added to the polymeric material prior to injection molding or blow molding. The phosphorescent agent and its concentration in the polymeric material may be selected to illuminate at a wavelength of attraction for both day and night time insect attraction. The phosphorescent or photoluminescent agent may also be added to the polymeric material of the trap lid 109, 149, snap bucket ring 108 or bucket 110 to increase the luminescence and effectiveness to attract the target insects. Other materials can potentially be used instead of polymers, but in an embodiment the material is not metal and/or mesh. In an embodiment, the bucket 110 or container is made of a transparent material that allows the luminescent property of the funnel cones 107 to shine through, and to judge how many insets have been trapped. Concentrations of phosphorescent or photoluminescent agent in the polymeric material may range as follows: 3 to 20% by weight, such as 5 to 15%, or 7 to 10%.

In an embodiment, scent or pheromones can also be injected into all or any of the funnel cones 107, lid 109, 149, snap bucket ring 108 or bucket 110 to increase the effectiveness to attract the target insects. These compounds may be selected from those disclosed above and can be added to the polymeric material prior to injection molding or blow molding. The temperature of the polymeric batch in the molding process should not exceed the flash point of the of the scent or pheromones. For example, the temperature should not exceed 70 to 100 C degrees, such as. Concentrations of scent or pheromone in the polymeric material may range as follows: 3 to 20% by weight, such as 5 to 15%, or 7 to 10%.

As mentioned above, a lure or bait can be used in the bucket to attract the target insects. Multiple baits or lures may be used, including for example, a sugar based bait, heptyl butyrate, pheromones, food, meat, fish, and feces. These can all be added to the bucket trap to increase the attractiveness of insects to and inside the trap.

In an embodiment, multiple different funnel cones 107 with different characteristics are combined in the lid 109, 149. The different characteristics include: scent, dimension, or phosphorescent wave length. Thus, in an embodiment, a bucket lid trap 101 may include four funnel cone traps 107, a first funnel cone trap 107 having a first scent or pheromone impregnated or injected, e.g. molded in the polymeric material, a second funnel cone trap 107 having a first phosphorescent or photoluminescent compound that emits light at a first wavelength, a third funnel cone trap 107 having a second scent or pheromone impregnated or injected, e.g. molded in the polymeric material, and a fourth funnel cone trap 107 having a second phosphorescent compound that emits light at a second wavelength. Furthermore, a bait or lure can be deposited inside the bucket 110 to attract even more varieties of insects. The combination of different scents/pheromones, luminescent wavelengths, and/or bait can be used to attract multiple target insects.

In an embodiment, the funnel cones 107 described may be replaced with other geometrical shaped inlets to the interior of the bucket 110 or container but has all the optional characteristics as described above. For example, the inlet may be a cylindrical shape, or some other shape that allows entry to the bucket 110 or container but prevents or discourages exit. In an embodiment, the inlet is not shaped to discourage exit, but has scent or luminescent compounds imbedded in polymeric material and relies on a means for killing the insects in the trap 101, such as electricity, glue, pesticide, or water for drowning.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

I claim:

1. An insect trap comprising:
a container for holding insects, and
a lid coupled to a top of the container comprising openings for multiple conically-shaped inserts;
multiple conically-shaped inserts, inserted into the openings and extending through the lid into the container, the inserts made of a polymeric material and having a plurality of apertures and a terminal opening, the terminal openings of the inserts being inside the container.

2. The insect trap of claim 1, wherein the multiple conically-shaped inserts include a scent or a pheromone in the polymeric material.

3. The insect trap of claim 1, wherein multiple conically-shaped inserts include a photoluminescent or phosphorescent compound in the polymeric material.

4. The insect trap of claim 1, wherein the container holds a volume of 1 quart to 50 gallons.

5. The insect trap of claim 1, wherein the lid is connected directly to the top of the container.

6. The insect trap of claim 1, wherein a bottom of the insert has a smooth surface.

7. The insect trap of claim 1, further comprising a ring that is attached to the top of the bucket, and the lid is releasably joined to the ring through matching helical ridges.

8. The insect trap of claim 7, wherein the lid further comprises projections from a base of the lid configured to provide a surface by which a torque can be applied to screw the lid off or on to the ring.

9. The insect trap of claim 1, wherein the bottom of the insert points at a base of the container configured to rest on the ground.

10. The insect trap of claim 1, wherein the container is transparent.

11. The insect trap of claim 1, wherein the container is made of a polymeric material and the container includes an attractant in the polymeric material selected from the group consisting of one or more of: a scent, a pheromone, a photoluminescent compound, or a phosphorescent compound.

12. The insect trap of claim 1, further comprising a bait or lure deposited inside the container.

13. A lid for an insect trap container, comprising:
multiple openings for inserts extending through the lid;
multiple inserts, each comprising a polymeric material;
the multiple inserts extending from a top of the lid through the lid and to a bottom side of the lid, the multiple inserts having a terminal opening on the bottom side of the lid;
wherein the multiple inserts include an attractant in the polymeric material selected from the group consisting of one or more of: a scent, a pheromone, a photoluminescent compound, or a phosphorescent compound.

14. The lid of claim 13, wherein the multiple inserts comprise a first and a second insert, wherein the polymeric material of the first insert includes a pheromone or scent, and the polymeric material of the second insert comprises a photoluminescent or phosphorescent compound.

15. The lid of claim 13, wherein the multiple inserts comprise a first and a second insert, wherein the polymeric material of the first insert includes a pheromone or scent, and the polymeric material of the second insert comprises a second and different pheromone or scent.

16. The lid of claim 13, wherein the multiple inserts comprise a first and a second insert, wherein the polymeric material of the first insert includes a photoluminescent or phosphorescent compound that emits light at a first wavelength, and the polymeric material of the second insert includes a photoluminescent or phosphorescent compound that emits light at a second wavelength.

17. The lid of claim 13, wherein the insert comprises an upper opening and a frusto-conical end defining a lower opening, the upper and lower opening joined by sidewalls.

* * * * *